(12) United States Patent
Post

(10) Patent No.: US 6,921,480 B2
(45) Date of Patent: Jul. 26, 2005

(54) FLAT-FOLDABLE FILTER FUNNEL

(76) Inventor: Laurie Ann Post, 3009 Vistacrest Dr., Los Angeles, CA (US) 90068

(*) Notice: Subject to any disclaimer, the term of this patent is extended or adjusted under 35 U.S.C. 154(b) by 63 days.

(21) Appl. No.: 10/429,996

(22) Filed: May 5, 2003

(65) Prior Publication Data
US 2004/0222147 A1 Nov. 11, 2004

(51) Int. Cl.[7] .............................................. B01D 29/085
(52) U.S. Cl. ....................... 210/238; 249/470; 249/482; 249/493.1; 249/497.3; 249/498; 249/499
(58) Field of Search ................................ 210/238, 249, 210/250, 470, 474, 482, 497.3, 498, 493.1, 499; 141/331, 337; 99/279, 304, 306, 323; 426/82; 220/460

(56) References Cited

U.S. PATENT DOCUMENTS

| | | | |
|---|---|---|---|
| 2,835,191 A | 5/1958 | Clurman | |
| 3,334,574 A | 8/1967 | Douglas | |
| 3,971,305 A | 7/1976 | Daswick | |
| D250,804 S | 1/1979 | Nilsson | |
| 4,382,861 A | 5/1983 | Adeboi et al. | |
| D274,115 S | 6/1984 | Gavin et al. | |
| 4,584,101 A * | 4/1986 | Kataoka | 210/474 |
| 4,981,588 A * | 1/1991 | Poulallion | 210/474 |
| 5,055,311 A * | 10/1991 | Brauer, Jr. et al. | 426/82 |
| 5,059,325 A | 10/1991 | Iida | |
| 5,605,710 A | 2/1997 | Pridonoff et al. | |
| 5,664,480 A | 9/1997 | DiFilippo | |
| 5,771,777 A | 6/1998 | Davis | |
| 5,778,765 A | 7/1998 | Klawuhn et al. | |
| 6,079,318 A | 6/2000 | Davis | |
| 6,343,542 B1 | 2/2002 | Shen | |

FOREIGN PATENT DOCUMENTS

| | | | | |
|---|---|---|---|---|
| FR | 1105494 A * | 12/1955 | | 210/474 |
| FR | 2616083 | 12/1988 | | |
| JP | 01126923 A * | 5/1989 | | A47J/31/06 |
| JP | 05300841 A * | 11/1993 | | A47J/43/28 |

* cited by examiner

*Primary Examiner*—Matthew O. Savage
(74) *Attorney, Agent, or Firm*—Kelly Lowry & Kelley, LLP

(57) ABSTRACT

A flat foldable filter funnel having open and flat-folded configurations includes a base having an elongated aperture, and a generally wedge-shaped filter support. The filter support includes at least two opposing pleated walls, and at least two opposing sidewalls connected at a first end of the filter support to define a fluid flow aperture. At least a portion of the filter support extends through the elongated aperture. The filter funnel may also include a fine mesh adjacent to the fluid flow aperture. The filter funnel may be adapted to include a plurality of fluid flow apertures located on the sidewalls and pleated walls.

27 Claims, 2 Drawing Sheets

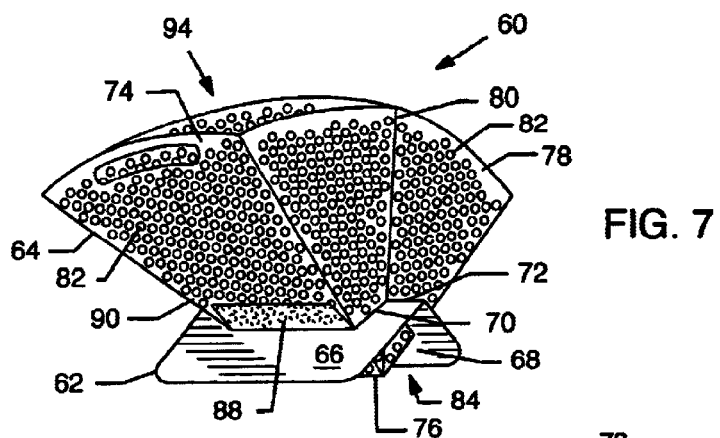
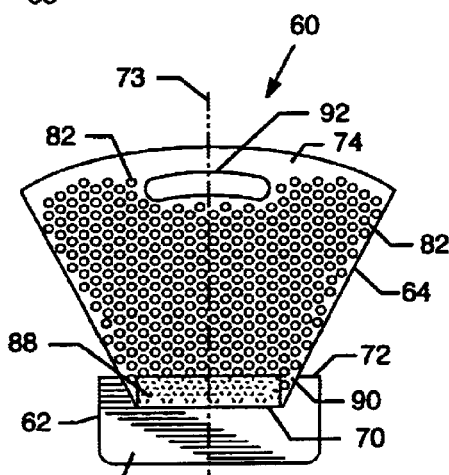
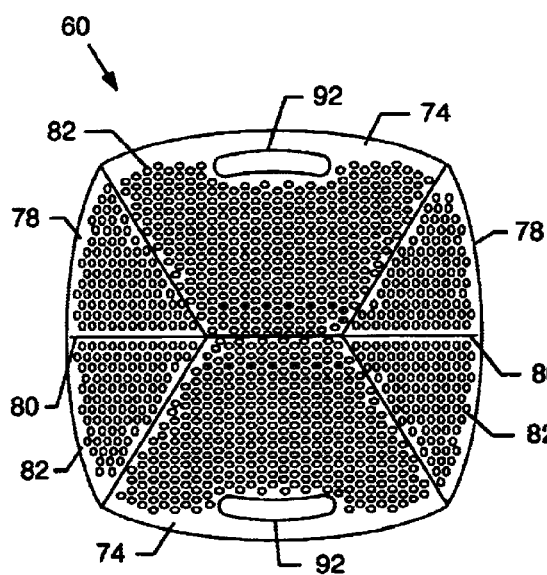
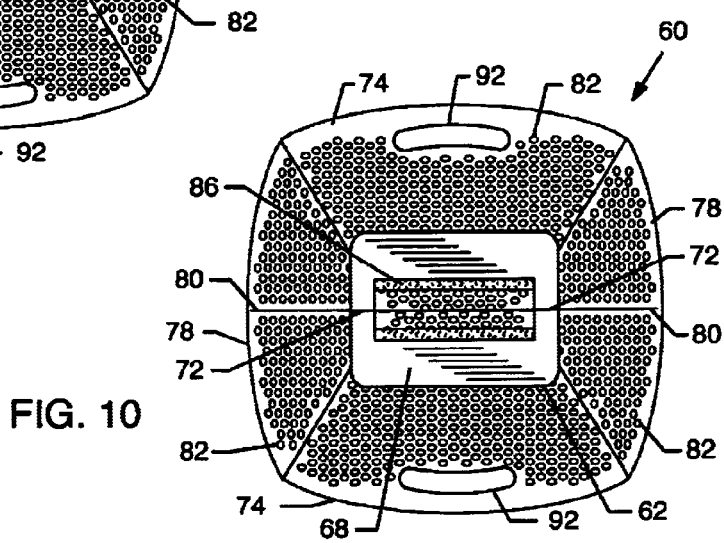

FLAT-FOLDABLE FILTER FUNNEL

BACKGROUND OF THE INVENTION

The invention relates to portable liquid straining devices. More particularly, the present invention relates to a flat-foldable filter funnel useable as or with a coffee filter or as a pasta strainer.

There are two basic ways by which a cup of coffee is typically made. The first method involves brewing an entire pot of coffee (using such methods as percolation or drip brewing) which will yield at least several cups of coffee. This is a very efficient way to make coffee, especially if the pot of coffee is intended to be shared by several individuals or if a single person desires several cups of coffee. The second method involves making a cup of 'instant' coffee where hot water is mixed with freeze-dried coffee. An individual making 'instant' coffee can make as little or as much coffee as he or she desires. However, despite the ease by which it can be made, 'instant' coffee often lacks the taste quality of brewed coffee.

Of the two methods of brewing mentioned above, drip brewing (i.e., the process of pouring boiling water over ground coffee which produces liquid coffee that is then separated from the grounds by a filter) is the most common method for preparing coffee. In general, there are two types of filters available for drip coffee; one type is made of paper and the other type is made of metal or plastic mesh. The vast majority of coffee drinkers prefer paper filters, all of which require the use of a filter holder or funnel.

Many different types of apparatus have been employed to make individual cups of coffee. For example, U.S. Pat. No. 5,771,777, discloses a disposable beverage maker. However, the beverage maker requires assembly before it can be used. This system is not practical for those individuals who are unwilling to go to the trouble of having to assemble a beverage maker in order to obtain a cup of coffee or for those individuals who, in their own minds, lack the manual dexterity required to assemble the beverage maker without first already having had a cup of coffee in the morning. U.S. Pat. No. 5,605,710 discloses a single cup disposable coffee brewing device. However, this coffee brewing device is intended for single use only as a coffee filter and coffee grounds are pre-packaged into the device. It is not practical for those individuals who enjoy a particular brand or unique flavor of coffee as it would be up to the manufacturer of the brewing device to choose which kind or flavor of coffee would be included in the brewing device and not the individual user.

While methods such as those described above may provide means of brewing individual cups of coffee, there remains a need to accommodate the individual tastes and needs of the coffee drinking public. Accordingly, what is needed is a device which allows a user to make a single cup of coffee. Such a device would preferably include an attractive, inexpensive filter holder capable of being used with conventional filters. Moreover, a device is needed that may be used with a variety of brands or flavors of coffee. Additionally, a coffee filter holder is needed that is collapsible for easy, flat storage. The present invention fulfills these needs and provides other related advantages.

SUMMARY OF THE INVENTION

The present invention resides in a flat-foldable filter funnel having open and flat-folded configurations. The filter funnel includes a base having an elongated aperture and a generally wedge-shaped filter support. The filter support includes at least two opposing pleated walls, and at least two opposing sidewalls connected at a first end of the filter support. The two sidewalls at the first end define a fluid flow aperture. At least a portion of the filter support extends through the elongated aperture and each of the sidewalls is connected to the base. A conventional coffee filter can be placed within the filter support.

Each of the pleated walls includes at least one pleat along which the pleated wall folds upon itself. The pleated walls fold along a central plane to place the sidewalls adjacent to each other when the filter funnel is placed in the flat-folded configuration.

The base includes at least one pleat along which the base folds upon itself. The base folds along a central plane to place the sidewalls adjacent to each other when the filter funnel is placed in the flat-folded configuration. The base further includes at least two tabs generally adjacent to the elongated aperture and connected to respective sidewalls of the filter support.

In the event a user does not have a conventional coffee filter or simply desires not to use one, the filter funnel could include a fine mesh adjacent to the fluid flow aperture in order to separate the brewed coffee from the coffee grounds.

At least one of the filter support and the base are comprised of a flexible plastic material. Alternatively, at least one of the filter support and the base are comprised of a stiff paper material.

In another embodiment of the present invention, with some modifications, the structure of the coffee filter funnel described above can be adapted to act as a pasta strainer. In this embodiment, the filter support includes a plurality of fluid flow apertures located on the sidewalls and pleated walls. Each of the at least two sidewalls further includes an elongated aperture located at a second end of the holder that allows a user to grip the funnel. The base is also generally v-shaped in the open configuration to assist in keeping the funnel upright when in the open configuration.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 7 is a perspective view of an alternative filter funnel of the present invention in an open position;

FIG. 8 is a front elevational view of the filter funnel of FIG. 7;

FIG. 9 is a top plan view of the filter funnel of FIG. 7; and

FIG. 10 is a bottom plan view of the filter funnel of FIG. 7.

DETAILED DESCRIPTION OF THE PREFERRED EMBODIMENTS

Figure 1:
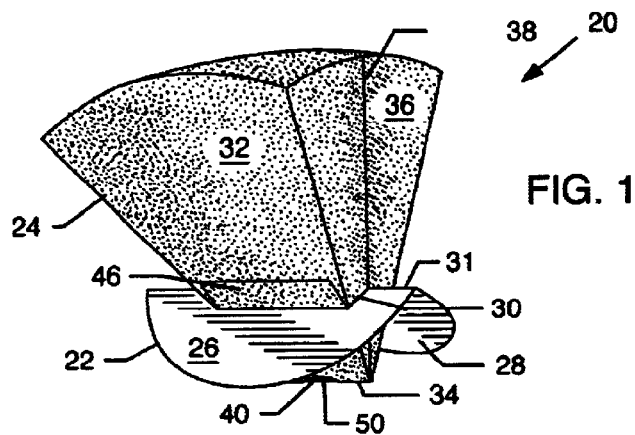
FIG. 1 is a perspective view of the filter funnel of the present invention in an open position.
Figures 2, 3, 4, 5:
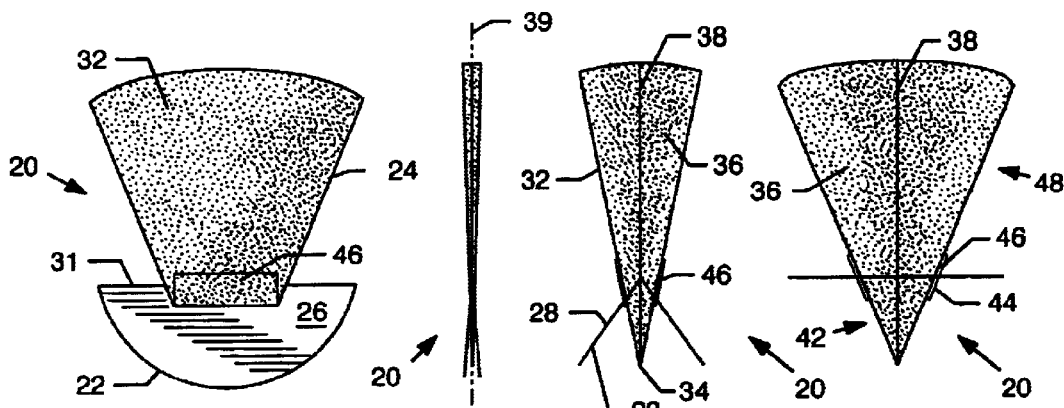
FIG. 2 is a front elevational view of the filter funnel of FIG. 1 in a closed position.
FIG. 3 is a side elevational view of the filter funnel of FIG. 2.
FIG. 4 illustrates the filter funnel of FIG. 3 in a partially open position.
FIG. 5 illustrates the filter funnel of FIG. 3 in a fully open position.

The present invention resides in a flat foldable filter funnel useable as or with a coffee filter or as a pasta strainer. The present invention an attractive, inexpensive, foldable filter holder for use in a variety of situations, such as functioning as a fully portable, self-contained complete coffeemaker and filter holder or as a pasta strainer. The present invention is capable of being used with conventional filters. The present invention is also collapsible for easy, flat storage.

In accordance with one embodiment of the present invention, a coffee filter funnel 20, as illustrated in FIGS. 1–6, is preferably relatively deep enough to hold a #4 size paper cone coffee filter, but can otherwise be any size.

The filter funnel 20 may be manufactured using several different materials, including plastic and paper. The plastic may be a durable, flexible, heat-resistant, recyclable, non-toxic, reusable plastic. The paper may be similar to that used in conventional paper cups for hot liquids and relatively stiff. The paper may be colored to match the color of a conventional #4 filter, white, orange, yellow, blue, brown or any other desired color. Likewise, the plastic may be similarly colored.

The filter funnel 20 is movable from a flat, folded closed position to an open position. The filter funnel 20 includes a base 22 and a filter support 24. The base 22 has a first surface 26, a second surface 28, and an elongated central aperture 30 located generally in the middle of the base 22. The aperture 30 may be rectangular, circular, ovoid, or square in shape. In the open position, the base 22 is generally planar when viewed from the side and generally circular when viewed from above. In the closed position, the base 22 is folded in half along a pleat or fold 31 to form a generally semi-circular shape. In the alternative, the base 22 may include several pleats 31. In another alternative, when in the open position, the base 22 may be a shape other than circular, such as rectangular, square, ovoid, triangular or any other polygonal shape. The base 22 may be sized to cover the tops of small, medium, large and extra large coffee cups/mugs. A central axis 39 runs through the center of the filter funnel 20 and is co-planar with a central plane running through the center of the filter funnel 20.

In the open position, the filter support 24 may be four-sided, forming a wedge shape or pie-slice shape. In the alternative, the filter support 24 may be conical in shape. The filter support 24 includes at least two opposing sidewalls 32 connected at a first end 34. The support 24 further includes at least two opposing pleated walls 36 where each of the walls 36 includes at least one pleat or fold 38 along which the walls 36 fold when moved between open and closed positions. When the funnel 20 is being closed, each of the pleated walls 36 folds upon itself. The base 22 folds along the central plane to place the sidewalls 32 adjacent to each other when the filter funnel 20 is placed in the flat-folded configuration. In the alternative, the walls 36 may include several pleats 38. An aperture 40 for allowing liquid to pass through the support 24 is located at the first end 34 and defined by the sidewalls 32. The filter support 24 is connected to the base 22 such that at least a portion 42 of the filter support 24 extends through the elongated aperture 30 of the base 22.

The sidewalls 32 are connected to the base 22. The base 22 further includes at least two tabs 44 on the second surface 28, generally adjacent to and on opposite sides of the elongated aperture 30. The tabs 44 are connected to the exterior of the filter support 24 along the portion 42 of the filter support 24 extending through the elongated aperture 30. The tabs 44 provide support for the filter support 24 when in use, with each tab 44 preventing the filter support 24 from falling over in the opposite direction. The tabs 44 also assist in the opening and closing of the filter funnel 20. The base 22 additionally includes at least two tabs 46 on the first surface 26, generally adjacent to and on opposite sides of the elongated aperture 30. The tabs 46 are connected to an exterior portion 48 of the filter support 24 closest to the first surface 26 of the base 22. The tabs 44, 46 are connected to the filter support 24 along the sidewalls 32. The pleated walls 36 are not connected to the base 22, thereby freely permitting the filter support 24 to fold inward along the pleats 38 and the circular base 22 to fold downward (i.e., in half) along the pleat 31 when moved to the closed position. The pleated walls 36 allow the filter funnel 20 to fold inward to a closed position that is relatively flat for storage.

In the alternative, a section of mesh 50 may be located above the aperture 40 of the filter support 24 in order to make coffee without the use of a conventional paper coffee filter. The mesh may be varied in size. In the case of coffee, the mesh may be a fine mesh, sized to prevent coffee grounds from passing through the aperture 40. The section of mesh 50 may be made of plastic or metal. The section of mesh 50 may be approximately one inch square and held in place above and adjacent to the aperture 40 by and between the two bottom flaps of the filter support 24 and the body of the filter support 24.

Figure 6:
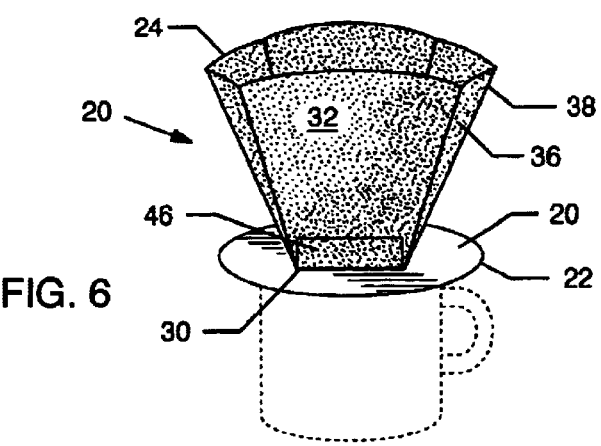
FIG. 6 illustrates the filter funnel of FIG. 1 positioned on a coffee cup.

In use, the filter funnel 20 is collapsible for easy, flat storage or pops open for use. The tabs 44, 46 connect the base 22 and filter support 24 to each other such that as one opens or closes, the other opens or closes. When a user moves the base 22 from its folded in half, closed position to an open, planar position, the tabs 44, 46 pull on the sidewalls 32 of the filter support 24, causing the pleated walls 36 to open and move the filter support 24 from a closed, flat position to an open position. In the open position, the filter funnel 20 may be placed atop a coffee pot, thermos, or single coffee cup (as shown in FIG. 6). A conventional paper filter may then be placed within the filter support 24. A user may then place a desired amount of ground coffee to the filter and then pour a desired amount of boiling water on top of the ground coffee. The boiling water will filter through the grounds and coffee will pass through the conventional paper filter, through the aperture 40 of the filter support 24 and down into the cup, mug or container positioned below the base 22. In the alternative, instead of conventional loose ground coffee and paper filter, a user may place a pre-packaged coffee-bag (of a type similar to a teabag) into the filter support 24, pour hot water over the coffee bag and allow coffee to pass through the aperture 40 down into the cup, mug or container below the base 22.

In accordance with another embodiment of the present invention, a filter-funnel that acts as a pasta strainer 60, as illustrated in FIGS. 7–10, is preferably relatively deep enough to hold several servings of pasta, but can otherwise be any size.

The pasta strainer 60 may be manufactured using several different materials, including plastic and paper. The plastic may be a durable, flexible, heat-resistant, recyclable, non-toxic, reusable plastic. The paper may be similar to that used in conventional paper cups for hot liquids and relatively stiff. The paper may come in several colors including, but not limited to, white, orange, yellow, blue, brown or any other desired color. Likewise, the plastic may be similarly colored.

The pasta strainer 60 is movable from a flat, folded closed position to an open position. The pasta strainer 60 includes a base 62 and a container 64. The base 62 has a first surface 66 and a second surface 68 and an elongated central aperture 70 located generally in the middle of the base 62. The aperture 70 may be rectangular, circular, oval, or square in shape. In the open position, the base 62 is generally an inverted v-shape when viewed from the side and generally rectangular when viewed from above. In the closed position, the base 62 is folded in half along a pleat or fold 72 to appear rectangular when viewed from one side and generally planar when viewed from another side. In the alternative, the base 62 may be a polygonal shape other than rectangular. In another alternative, the base 62 may include several pleats 72. A central axis 73 runs through the center of the pasta strainer 60 and is co-planar with a central plane running through the center of the pasta strainer 60.

In the open position, the container 64 may be four-sided, forming a wedge shape or pie-slice shape. The container 64 includes at least two sidewalls opposing 74 connected at a first end 76. The container 64 further includes at least two pleated opposing walls 78 where each of the walls 78 includes at least one pleat or fold 80 along which the walls 78 fold when moved between open and closed positions. When the pasta strainer 60 is being closed, each of the pleated walls 78 folds upon iself. The base 62 folds along the central plane to place the sidewalls 74 adjacent to each other when the pasta strainer 60 is placed in the flat-folded configuration. Each of the walls, 74, 78 include a plurality of apertures 82 for allowing liquid to pass. The container 64 is connected to the base 62 such that at least a portion 84 of the container 64 extends through the elongated aperture 70 of the base 62. In the alternative, the walls 78 may include several pleats 80.

The sidewalls 74 are connected to the base 62. The base 62 further includes at least two tabs 86 on the second surface 68, generally adjacent to and on opposite sides of the elongated aperture 70. The tabs 86 are connected to the exterior of the container 64 along the portion 84 of the container 64 extending through the elongated aperture 70. The tabs 86 provide support for the container 64 when in use, with each tab 86 preventing the container 64 from falling over in the opposite direction. The tabs 86 also assist in the opening and closing of the pasta strainer 60. The base 62 additionally includes at least two tabs 88 on the first surface 66, generally adjacent to and on opposite sides of the elongated aperture 70. The tabs 88 are connected to an exterior portion 90 of the container 70 closest to the first surface 66 of the base 62. The tabs 86, 88 are connected to the container 64 along the sidewalls 74. The pleated walls 78 are not connected to the base 62, thereby freely permitting the container 64 to fold inward along the pleats 80 and the base 62 to fold downward (i.e., in half) along the pleat 72 when moved to the closed position. The pleated walls 78 allow the pasta strainer 60 to fold inward to a closed position that is relatively flat for storage.

Each of the sidewalls 74 includes an elongated aperture 92 near a top or second end 94 of the container 64. The elongated aperture 92 may be rectangular, ovular. The sides of the aperture 92 may be straight or curved.

In use, the pasta strainer 60 is collapsible for easy, flat storage or pops open for use. The tabs 86, 88 connect the base 62 and container 64 to each other such that as one opens or closes, the other opens or closes. When a user moves the base 62 from its folded in half, closed position to an open, inverted v-shape position, the tabs 86, 88 pull on the sidewalls 74 of the container 64, causing the pleated walls 78 to open and move the container 64 from a closed, flat position to an open position. In the open position, the pasta strainer 60 may be placed in a sink over drain. A pot of boiling water containing pasta that has been cooked can then be moved from a stove or other location and positioned over the pasta strainer 60. A user may then pour the contents of the pot, including boiling water and pasta, into the container 64. The boiling water will filter through the apertures 82 of the container 64, and down into the sink drain, leaving the cooked pasta behind in the container 64.

In the alternative, another embodiment of the filter funnel 20 may include a three-sided filter support (not shown) movable from a flat, folded closed position to an open position in which the filter support forms an inverted triangular shape. In this embodiment, two sidewalls of the filter support are joined at a first end but there is only one pleated wall. This embodiment is otherwise similar to the embodiment shown in FIGS. 1–6.

In another alternative, a further embodiment of the filter funnel 20 may include a two sided filter support (not shown) movable from a flat, folded closed position to an open position in which the filter support forms a cone shape. In this embodiment, two side walls of the filter support are joined along their perimeters except at the top. There are no pleated walls. This embodiment is otherwise similar to the embodiment shown in FIGS. 1–6.

In a further alternative, another embodiment of the filter funnel 20 may include a filter support 24 and base 22, as shown in FIGS. 1–6. However, in this embodiment, the base 22 does not fold along a pleat. Instead, when the base 22 folds to a flat position, one part of the base 22 folds downward along one of the sidewalls 32 of the filter support 24, while the other portion of the base 22 folds upward against the other sidewall 32 of the filter support 24. This embodiment is otherwise similar to the embodiment shown in FIGS. 1–6.

The present invention is suitable for use in homes, hotels, motels, offices, at sporting events, when camping, on pleasure boats and in any environment where hot beverages are used. In a hotel or vacation environment, a coffee filter funnel of the present invention may be sometimes packaged with a portion of specialty coffee.

Although several embodiments have been described in detail for purposes of illustration, various modifications may be made without departing from the scope and spirit of the invention. Accordingly, the invention is not to be limited, except as by the appended claims.

What is claimed is:

1. A filter funnel having open and flat-folded configurations, comprising:
    a base including an elongated aperture and at least one pleat along which the base folds upon itself; and
    a generally wedge-shaped filter support including at least two opposing pleated walls, and at least two opposing sidewalls connected to each other at a first end of the filter support and defining a fluid flow aperture, wherein at least a portion of the filter support extends through the elongated aperture, and each of the sidewalls is connected to the base.

2. The funnel of claim 1, wherein each of the pleated walls includes at least one pleat along which the pleated wall folds upon itself.

3. The funnel of claim 1, wherein the pleated walls fold along a central plane to place at least a portion of the sidewalls adjacent to each other when the filter funnel is placed in the flat-folded configuration.

4. The funnel of claim 1, wherein the base folds along a central plane to place at least a portion of the sidewalls adjacent to each other when the filter funnel is placed in the flat-folded configuration.

5. The funnel of claim 1, including a fine mesh adjacent to the fluid flow aperture.

6. The funnel of claim 1, wherein the base includes at least two tabs generally adjacent to the elongated aperture and connected to respective sidewalls of the filter support for connecting the sidewalls to the base.

7. The tunnel of claim 1, wherein at least one of the filter support and the base are comprised of a flexible plastic material.

8. The funnel of claim 1, wherein at least one of the filter support and the base are comprised of a stiff paper material.

9. The funnel of claim 1, wherein the filter support includes a plurality of fluid flow apertures located on the sidewalls and pleated walls.

10. The funnel of claim 9, wherein each of the at least two sidewalls further includes an elongated aperture located at a second end of the holder.

11. The funnel of claim 9, wherein the base is generally v-shaped in the open configuration.

12. A filter funnel having open and flat-folded configurations, comprising:
   a base including an elongated aperture and at least one pleat along which the base folds upon itself; and
   a generally wedge-shaped filter support including at least two opposing pleated walls, and at least two opposing sidewalls connected to each other at a first end of the filter support and defining a fluid flow aperture, wherein at least a portion of the filter support extends through the elongated aperture, each of the sidewalls is connected to the base, and each of the pleated walls includes at least one pleat along which the pleated wall folds upon itself.

13. The funnel of claim 12, wherein the pleated walls fold along a central plane to place at least a portion of the sidewalls adjacent to each other when the filter funnel is placed in the flat-folded configuration.

14. The funnel of claim 12, wherein the base folds along a central plane to place at least a portion of the sidewalls adjacent to each other when the filter funnel is placed in the flat-folded configuration.

15. The funnel of claim 12, including a fine mesh adjacent to the fluid flow aperture.

16. The funnel of claim 12, wherein the base includes at least two tabs generally adjacent to the elongated aperture and connected to respective sidewalls of the filter support for connecting the sidewalls to the base.

17. The funnel of claim 12, wherein at least one of the filter support and the base are comprised of a flexible plastic material.

18. The funnel of claim 12, wherein at least one of the filter support and the base are comprised of a stiff paper material.

19. The funnel of claim 12, wherein the filter support includes a plurality of fluid flow apertures located on the sidewalls and pleated walls.

20. The funnel of claim 19, wherein each of the at least two sidewalls further includes an elongated aperture located at a second end of the holder.

21. The funnel of claim 19, wherein the base is generally v-shaped in the open configuration.

22. A filter funnel having open and flat-folded configurations, comprising:
   a base including an elongated aperture and at least one pleat along which the base folds upon itself; and
   a generally wedge-shaped filter support including at least two opposing pleated walls, and at least two opposing sidewalls connected to each other at a first end of the filter support and defining a fluid flow aperture;
   wherein at least a portion of the filter support extends through the elongated aperture, and each of the sidewalls is connected to the base, and wherein the base includes at least two tabs generally adjacent to the elongated aperture and connected to respective sidewalls of the filter support for connecting the sidewalls to the base.

23. The funnel of claim 22, wherein each of the pleated walls includes at least one pleat along which the pleated wall folds upon itself.

24. The funnel of claim 23, wherein the pleated walls fold along a central plane to place at least a portion of the sidewalls adjacent to each other when the filter funnel is placed in the flat-folded configuration.

25. The funnel of claim 24, wherein the base folds along a central plane to place at least a portion of the sidewalls adjacent to each other when the filter funnel is placed in the flat-folded configuration.

26. The funnel of claim 25, including a fine mesh adjacent to the fluid flow aperture.

27. The funnel of claim 22, wherein the filter support includes a plurality of fluid flow apertures located on the sidewalls and pleated walls, each of the at least two sidewalls includes an elongated aperture located at a second end of the holder, and wherein the base is generally v-shaped in the open configuration.

* * * * *

UNITED STATES PATENT AND TRADEMARK OFFICE
CERTIFICATE OF CORRECTION

PATENT NO. : 6,921,480 B2  
DATED : July 26, 2005  
INVENTOR(S) : Laurie Ann Post It is certified that error appears in the above-identified patent and that said Letters Patent is hereby corrected as shown below:

Column 7,
Line 11, correct the word "tunnel" to -- funnel --.

Signed and Sealed this

Twenty-seventh Day of September, 2005

JON W. DUDAS
*Director of the United States Patent and Trademark Office*